United States Patent [19]
Kishi et al.

[11] Patent Number: 4,642,754
[45] Date of Patent: Feb. 10, 1987

[54] ANGLE DATA DISCRIMINATING METHOD

[75] Inventors: Hajimu Kishi; Masaki Seki; Takashi Takegahara, all of Tokyo, Japan

[73] Assignee: Fanuc Ltd., Minamitsuru, Japan

[21] Appl. No.: 694,383

[22] PCT Filed: Feb. 20, 1984

[86] PCT No.: PCT/JP84/00055
§ 371 Date: Jan. 7, 1985
§ 102(e) Date: Jan. 7, 1985

[87] PCT Pub. No.: WO84/04609
PCT Pub. Date: Nov. 22, 1984

[30] Foreign Application Priority Data
May 18, 1983 [JP] Japan ................................. 58-087266

[51] Int. Cl.$^4$ ........................ G06F 15/46; G05B 19/18
[52] U.S. Cl. .................................. 364/191; 318/568;
364/171; 364/474
[58] Field of Search ................ 364/167-171,
364/188, 189, 191-193, 474, 475; 318/568

[56] References Cited
U.S. PATENT DOCUMENTS

| | | | |
|---|---|---|---|
| 3,783,253 | 1/1974 | Anderson et al. | 364/171 X |
| 4,010,356 | 3/1977 | Evans et al. | 364/191 X |
| 4,328,550 | 5/1982 | Weber | 364/192 X |
| 4,393,449 | 7/1983 | Takeda et al. | 364/191 X |
| 4,445,182 | 4/1984 | Morita et al. | 364/171 X |
| 4,530,046 | 7/1985 | Munekata et al. | 364/191 |

FOREIGN PATENT DOCUMENTS 0044192 1/1982 European Pat. Off. ............. 364/474

Primary Examiner—Joseph Ruggiero
Attorney, Agent, or Firm—Staas & Halsey

[57] ABSTRACT

An angle data discriminating method in a method of creating NC machining data by entering a direction for each block ($b_1$–$b_5$) of a part profile through use of a profile symbol key thereby to specify the part profile, followed by entering a dimension for each block of the part profile and using these entered data to create the NC machining data, the method having a first step of specifying dimensions of straight line elements ($L_3$, $L_4$) in predetermined blocks ($b_3$, $b_4$) by data including at least angles of intersection between the straight line elements and a base line (Z axis), and a second step of recognizing, by using the angles and the directions of the straight line elements in the blocks, that the straight line element lies on a straight line obtained by rotating the base line about the points of intersection in predetermined directions and through predetermined angles.

5 Claims, 19 Drawing Figures

FIG. 3
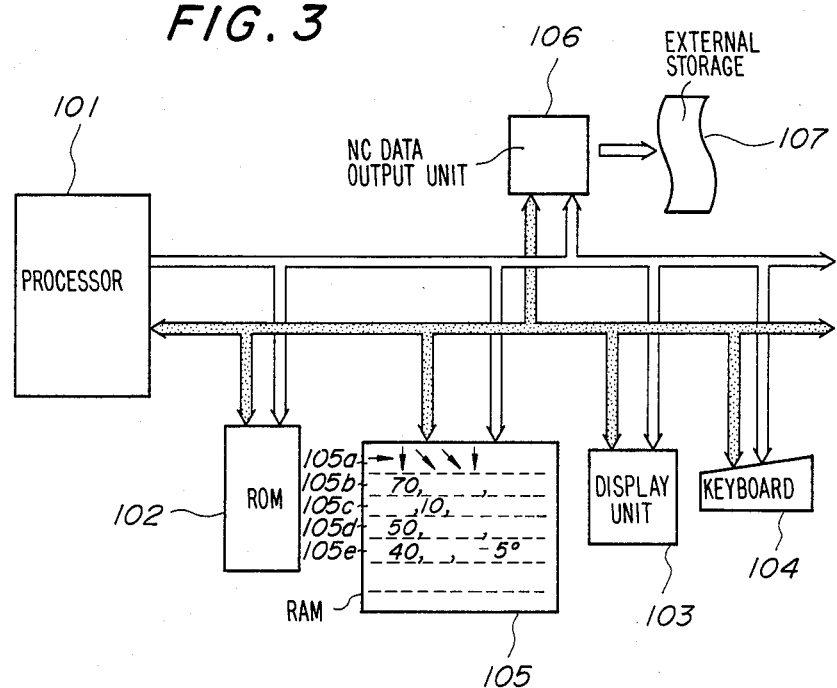
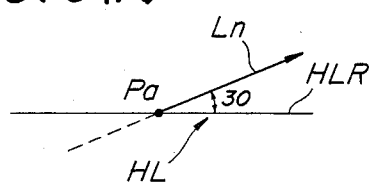
FIG. 6(A)
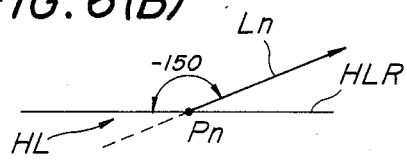
FIG. 6(B)
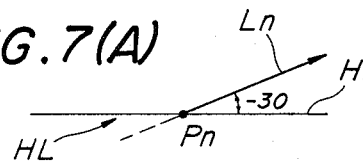
FIG. 7(A)
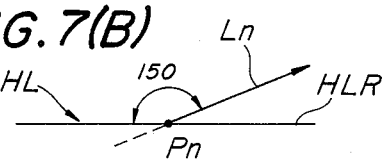
FIG. 7(B)
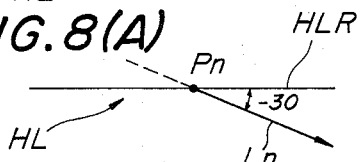
FIG. 8(A)
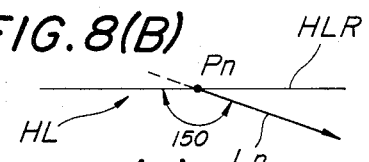
FIG. 8(B)
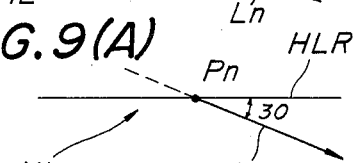
FIG. 9(A)
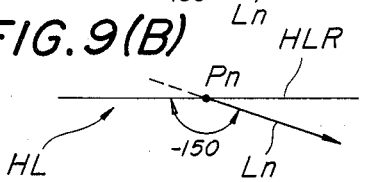
FIG. 9(B)

ANGLE DATA DISCRIMINATING METHOD

DESCRIPTION

1. Technical Field

This invention relates to an angle data discriminating method in an NC machining data creation method. More particularly, the invention relates to an angle data discriminating method in a method of creating NC machining data by entering a direction for each block of a part profile through use of profile symbol keys thereby to specify the part profile (exclusive of dimensions), followed by specifying the dimension of a straight line element in a predetermined block of the part profile by data including at least an angle of intersection between the straight line element and a base line, and using these entered data to create the NC machining data.

2. Background Art

Automatic programming systems for lathes have come into practical use and are used to create NC tapes from a design drawing through a simple operation by entering data in a conversational mode using a graphic display screen. With such an automatic programming system, a part profile can be entered merely by pressing profile symbol keys, which are located on an operator's panel, corresponding to a workpiece (part) profile written on a design drawing. Further, according to the automatic programming system, referential information is graphically displayed on the screen from time to time and inquiries are made in ordinary language, so that dimensions and various data can be entered in response to the inquiries. When all data necessary for creation of an NC tape have been entered, the blank profile and the finished profile are immediately displayed on the display screen, automatic calculation of NC command data begins and a tool path is graphically displayed to create an NC tape. A programming method performed by such an automatic programming system will now be described in detail. The method comprises the following steps:

(1) drawing mode selection step;
(2) blank profile and blank dimensions input step;
(3) part profile and part profile dimensions input step;
(4) machine reference point and turret position input step;
(5) process selection step;
(6) tool selection step;
(7) machining area and cutting conditions designation step; and
(8) tool path calculation step. The necessary data are entered successively to eventually create the NC tape. In the third step for entering part profile and dimensions, coordinate axes and the blank profile, as well as a part profile inquiry, are displayed on the screen, one responds to the inquiry, while observing the design drawing, by pressing a profile symbol key on the keyboard in accordance with the profile on the design drawing, thus to enter the part profile (exclusive of dimensions). Following the entry of the part profile, the display screen makes an inquiry requesting the necessary dimensions, and dimensions taken from the design drawing are entered from the keyboard in response to the inquiry, thereby completing the entry of a part profile and its dimensions. As an example, if the part profile has the shape shown in FIG. 1, then, in entering the part profile, predetermined profile symbol keys (keys indicated by the symbols ↑, ↗, →, ↘, ↓, ↙, ←, ↖, ↷, ↶ ), shown in FIG. 2 and provided on a keyboard 104, are pressed in accordance with the direction of each block. Specifically, a straight line element $L_1$ in a first block $b_1$ is directed horizontally (Z axis) rightward, a straight line element $L_2$ in a second block $b_2$ is directed vertically (X axis) downward, straight line elements $L_3$ and $L_4$ in third and fourth blocks $b_3$ and $b_4$ are directed downwardly toward the right, and a straight line element $L_5$ in a fifth block $b_5$ is directed downward. Therefore, entry of the part profile will completed if the symbolic keys are pressed in the order

→, ↓, ↘, ↘, ↓

It should be noted that the profile symbol keys become effective as numerical value input keys automatically in dependence upon the automatic programming process steps, and it becomes possible to enter the letter of the alphabet shown at the lower right of the key tops when a shift key is pressed.

Next, dimensions of the line elements in each of the blocks $b_1$–$b_5$ are entered in response to inquiries from the drawings. Specifically, $D=70$ is entered in response to an inquiry regarding a starting point in the first block, $L=10$ in response to an inquiry regarding the first block, $D=50$ in response to an inquiry regarding the dimension of the second block, $A=-5, D=40$ in response to an inquiry regarding the third block, $A=-20, D=30$ in response to an inquiry regarding the fourth block, and $D=0$ in response to an inquiry regarding the fifth block, wherein D represents the value of the diameter at the end point of each block, A denotes the angle (in which the counter-clockwise direction is taken as the positive direction) which the straight line element makes with the horizontal axis, and L designates the length of the straight line element along the Z axis.

Thus, in a method of creating NC machining data, angle information must provide the angle between the straight line element in each block and a horizontal axis in a predetermined coordinate system, with the counter-clockwise direction being taken as the positive direction. For example, the angle of the straight line element $L_3$ in the third block $b_3$ of FIG. 1 must be given as either $-5°$ or $175°$, and the angle of the straight line element $L_4$ in the fourth block $b_4$ must be given as either $-20°$ or $160°$. However, when it is thus prearranged so that the angles must be entered taking the counter-clockwise direction as the positive direction, the programmer must himself judge whether an angle (numerical value) written on a design drawing is positive or negative when entering the angle. This makes programming a troublesome operation and is a cause of programming errors.

Accordingly, an object of the present invention is to provide an angle data discriminating method in an NC machining data creation method, through which angles (numerical values) written on a design drawing can be entered as they are when making an angle entry.

Another object of the present invention is to provide an angle data discriminating method in an NC machining data creation method in which operation is simple and the occurrence of program errors can be prevented.

A further object of the present invention is to provide an angle data discriminating method in which the direction of each straight line element constituting a part profile is entered using profile symbol keys, and in which it can be discriminated whether an entered angle is positive or negative based on the direction of the straight line element and the magnitude of the entered angle.

DISCLOSURE OF THE INVENTION

The present invention provides an angle data discriminating method well-suited for application to a method of creating NC machining data by entering a direction for each block of a part profile through use of a profile symbol key thereby to specify the part profile, followed by entering a dimension for each block of the part profile and using these entered data to create the NC machining data. The angle data discriminating method includes steps of specifying a dimension of a straight line element in a predetermined block by data including at least an angle of intersection between the straight line element and a horizontal axis, and, by using the angle data and the direction of the straight line element in the block, recognizing that the straight line element lies on a straight line obtained by rotating, in a predetermined direction and through a predetermined angle, one segment of the horizontal axis which is bisected at the intersection. According to the present invention, an automatic programming apparatus is capable of making correct recognition of a straight line element even if angles (numerical values) written on a design drawing are entered as they are.

BRIEF DESCRIPTION OF THE DRAWINGS

FIG. 3 is a block diagram of an embodiment of the present invention, FIGS. 6(A), 6(B), 7(A), 7(B), 8(A), 8(B), 9(A) and 9(B) illustrate the angle discriminating method of the present invention.

BEST MODE FOR CARRYING OUT THE INVENTION

Figure 1:
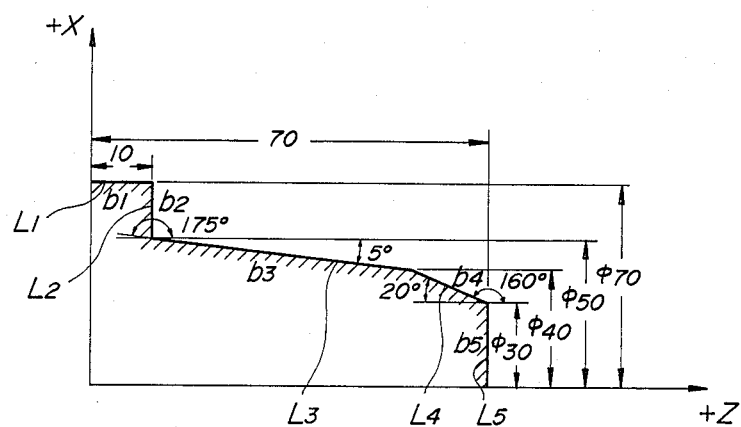
FIG. 1 is a view for describing the entry of a part profile and the dimensional values thereof in the creation of NC machining data.
Figure 4:
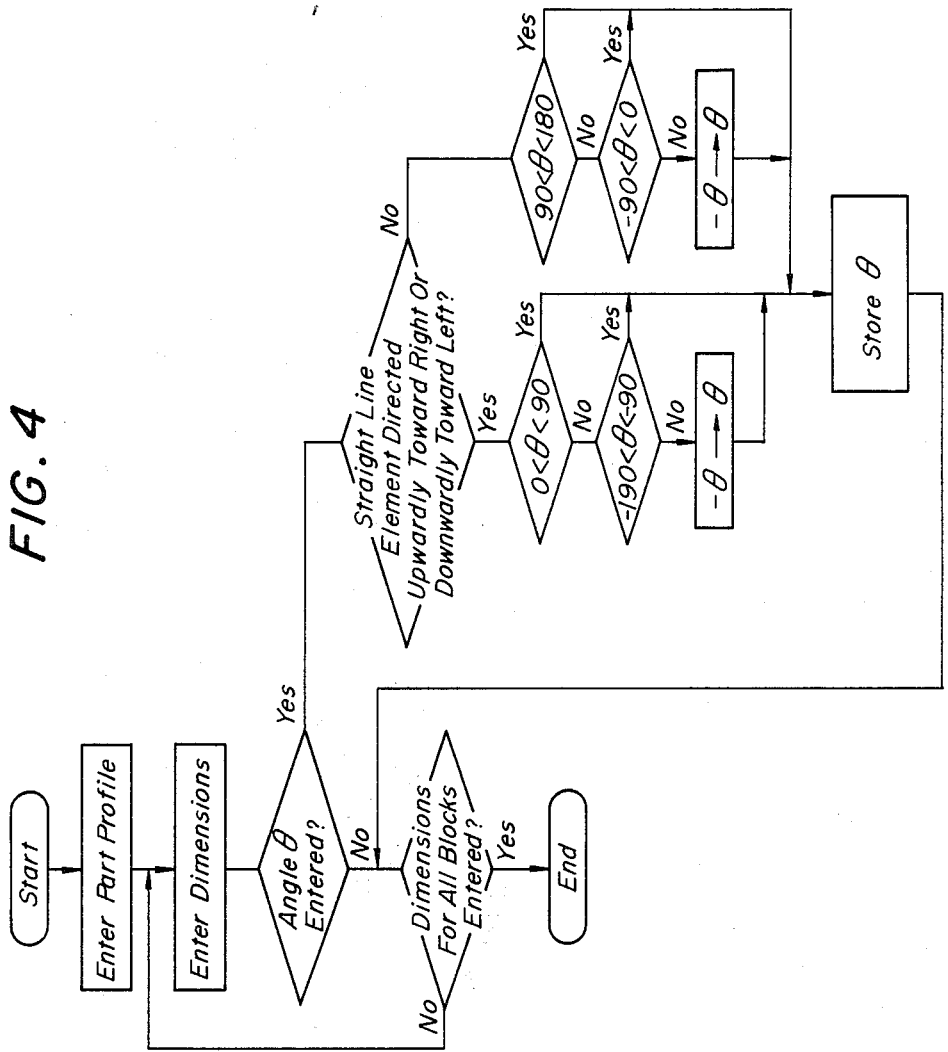
FIG. 4 is a flowchart of processing according to the present invention, FIGS. 5 (A)–5(F) illustrate images displayed when dimensions are entered according to the present invention.

FIG. 3 is a block diagram of an automatic programming apparatus to which the present invention can be applied, and FIG. 4 is a flowchart of processing. The description is based on the assumption that the NC machining data of the part profile shown in FIG. 1 are to be created.

(a) When the operation for entering the format of the design drawing, the profile of the blank and the dimensions is completed, a processor 101, which is under the control of a control program stored in a ROM 102, causes inquiries regarding a part profile to be displayed on the display screen of a display unit 103.

Figure 2:
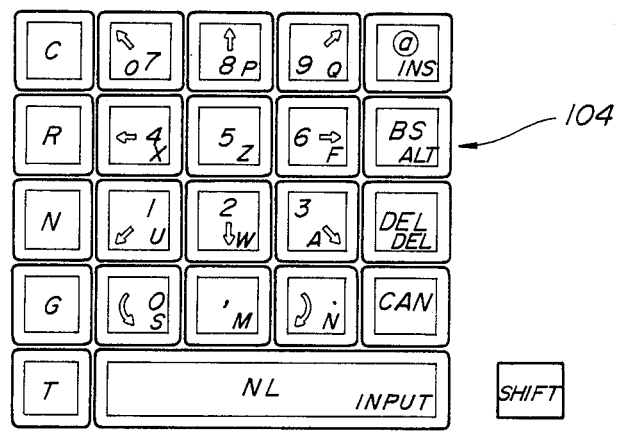
FIG. 2 is a view for describing profile symbol keys on a keyboard.

(b) While observing the design drawing, the operator responds to the inquiries by pressing the prescribed profile symbol keys (see FIG. 2) on a keyboard 104 one block at a time in the clockwise direction in accordance with the profile. When the operator presses an input key NL (FIG. 2) after entering the profile of the fifth block $b_5$, the part profile data ($\rightarrow$, $\downarrow$, $\searrow$, $\searrow$, $\downarrow$) are stored in a storage area 105$a$ of a RAM 105.

Figure 5A:
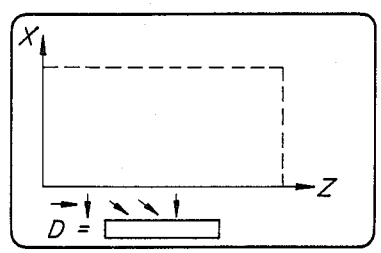

(c) When entry of a part profile is completed, the processor 101 causes the display screen to display the previously entered coordinate axes and blank profile (dashed line) which appear on the design drawing, the part profile in the form of the profile symbols ($\rightarrow$, $\downarrow$, $\searrow$, $\searrow$, $\downarrow$), and an inquiry reading "D=□", as illustrated in FIG. 5(A).

Figure 5B:
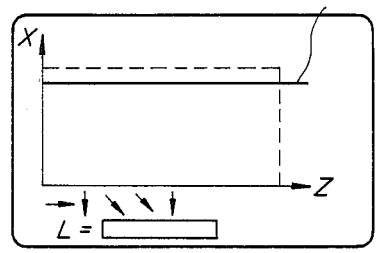

(d) In response to the inquiry, the operator enters the diameter value "70" at the starting point of the straight line element $L_1$ in the first block $b_1$, and subsequently presses the input key NL. When this is done, D=70 is stored in a storage area 105$b$ of the RAM 105, and a line $L_1'$ is displayed on the display screen [see FIG. 5(B)].

Figure 5C:
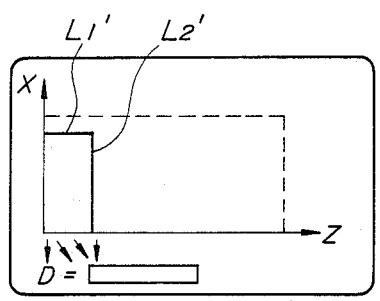

(e) When entry of the diameter value at the starting point of the first block has been completed, an inquiry "L=□" is displayed on the display screen, thereby calling for the length, along the Z axis, of the straight line element of the first block. After the entry of the length "10" in response to the inquiry, the input key NL is pressed to store L=10 in a storage area 105$c$ of the RAM 105. The display screen displays a straight line $L_2'$ extending along the $-X$ axis from the end point of the line segment $L_1'$, erases the profile symbol $\rightarrow$ of the first block, and displays an inquiry "D=□" regarding the value of the diameter at the starting point of the second block [see FIG. 5(C)].

Figure 5D:
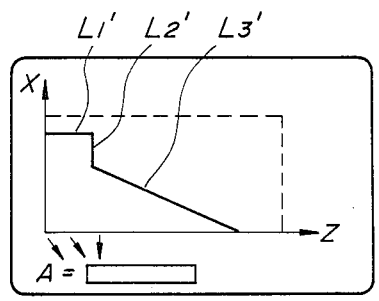

(f) After "50" is entered in response to the foregoing, the input key NL is pressed, whereupon D=50 is stored in a storage area 105$d$ of the RAM 105. The display screen displays the line segments $L_1'$, $L_2'$ and a straight line $L_3'$ extending downwardly toward the right from the end point of the line segment $L_2'$, erases the profile symbol $\downarrow$ of the second block, and displays an inquiry "A=□" calling for angle which the straight line element of the third block makes with the horizontal axis [FIG. 5(D)]. It should be noted that the following steps (g) through (n) are for a general case, and that the case exemplified in FIG. 1 will be described in steps (g') through (i') set forth later.

(g) After the angle (numerical value) is entered just as specified by the design drawing in response to the angle inquiry, the input key NL is pressed. When the angle $\theta$ arrives as an input, the processor 101 uses the part profile data stored in the RAM 105 to determine whether the profile in a current block is one of the following: a profile directed upwardly toward the right, downwardly toward the right, upwardly toward the left or downwardly toward the left (where it is assumed that $-180° < \theta < 180°$ holds).

(h) If the profile of the current block is directed upwardly toward the right or downwardly toward the left, it is determined whether the angle $\theta$ entered in step (g) satisfies the inequality $$0 < \theta < 90° \quad (1)$$

or the inequality $$-180° < \theta < -90° \quad (2)$$

or neither.

(i) A horizontal axis HL is bisected by a starting point $P_n$ of the straight line element $L_n$ in the current block [see FIG. 6(A) or FIG. 6(B)]. When one of the inequalities (1), (2) is satisfied, the processor recognizes that the right-hand segment HLR of the bisected horizontal axis HL will be superimposed on the straight line element when HLR is rotated counter-clockwise by $\theta°$. In other words, the processor recognizes that the angle $\theta$ is an angle between the straight line element $L_n$ and the horizontal axis when the counter-clockwise direction is taken as positive based on the right-hand segment HLR of the horizontal axis HL. It should be noted that rotation through $-\theta°$ in the counter-clockwise direction is the same as rotation through $\theta°$ in the clockwise direction. Accordingly, for the case shown in FIG. 6(B), the horizontal axis HL will be superimposed on the straight line segment $L_n$ if it is rotated counter-clockwise by $-150°$, or in other words, clockwise by $150°$.

(j) If the angle $\theta$ satisfies neither of the inequalities (1), (2) in step (h) [FIGS. 7(A), (B)], then the processor 101 recognizes that the right-hand segment HLR of the horizontal axis HL, which is bisected by the starting point of the straight line element in the current block, will be superimposed on the straight line element when HLR is rotated counter-clockwise by $-\theta°$ (clockwise by $\theta°$). In other words, the processor 101 recognizes that the angle $-\theta$ is an angle between the straight line element and the horizontal axis when the counter-clockwise direction is taken as positive based on the right-hand segment HLR of the horizontal axis.

(k) If the profile of the current block is directed downwardly toward the right or upwardly toward the left, it is determined whether the angle $\theta$ entered in step (g) satisfies the inequality $$90° < \theta < 180° \quad (3)$$

or the inequality $$-90° < \theta < 0° \quad (4)$$

or neither.

(m) If either expression (3) or (4) is satisfied [FIGS. 8(A), (B)], then the processor 101 recognizes that the right-hand segment HLR of the horizontal axis HL, which is bisected by the starting point $P_n$ of the straight line element $L_n$ in the current block, will be superimposed on the straight line element when HLR is rotated counter-clockwise by $\theta°$. In other words, the processor 101 recognizes that the angle $\theta$ is an angle between the straight line element and the horizontal axis when the counter-clockwise direction is taken as positive based on the right-hand segment HLR of the horizontal axis HL.

(n) If the angle $\theta$ satisfies neither of the expressions (3), (4) in step (k) [FIGS. 9(A), (B)], then the processor 101 recognizes that the right-hand segment HLR of the horizontal axis HL, which is bisected by the starting point $P_n$ of the straight line element $L_n$ in the current block, will be superimposed on the straight line element when HLR is rotated counter-clockwise by $-\theta°$ (clockwise by $\theta°$). In other words, the processor 101 recognizes that the angle $-\theta$ is an angle between the straight line element and the horizontal axis when the counter-clockwise direction is taken as positive based on the right-hand segment HLR of the horizontal axis.

The foregoing is for a general case. Hereinafter we shall return to a description of a specific example.

(g′) When the inquiry calling for the angle between the straight line element $L_3$ and the horizontal axis in the third block $b_3$ is displayed in step (f), the operator enters the angle (numerical value) "5" just as written on the design drawing and presses the input key NL. When the angle arrives as an input, the processor 101 refers to the profile data stored in the RAM 105 to determine whether the straight line element of the third block is directed upwardly toward the right, downwardly toward the right, upwardly toward the left or downwardly toward the left.

Since the profile in the third block is directed downwardly toward the right, the processor 101 determines whether the entered value ($=5°$) satisfies one of the expressions (3), (4). Since $\theta$ ($=5°$) satisfies neither of the expressions (3), (4), the processor 101 recognizes that the angle between the straight line element $L_3$ and the horizontal axis HLR when the counter-clockwise direction is taken as positive (the clockwise direction as negative) based on the right-hand horizontal axis HLR, is $-5°$. This is stored in a storage area 105e of the RAM 105.

Figure 5E:
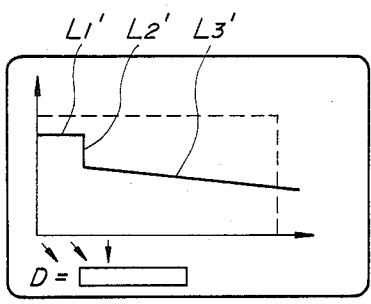

(h′) The straight line element $L_3'$ is displayed on the screen at the correct angle owing to the angle for this line element. Also displayed is an inquiry "D=□" calling for the value of the diameter at the end point of the straight line element $L_3$ [FIG. 5(E)].

Figure 5F:
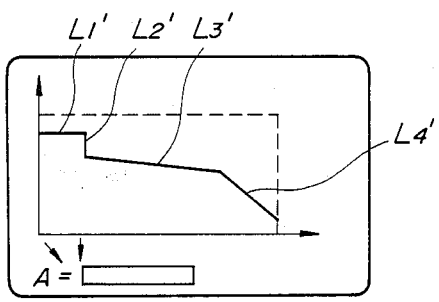

(i′) In response, the numerical value "40" is entered and the input key NL is pressed, whereupon D=40 is stored in the storage area 105e of the RAM 105 and the screen displays the line segments $L_1'$, $L_2'$, $L_3'$, the next straight line element $L_4'$, and an inquiry calling for the angle between the straight line element $L_4$ and the horizontal axis [FIG. 5(F)].

Thereafter, if the dimensions for the fourth and fifth blocks are entered in similar fashion, this will end input processing for the dimensions of the part profile.

The foregoing case in one where a part profile is entered in its entirety using the profile symbol keys, after which dimensions are entered one block at a time. However, an arrangement is permissible wherein dimensions are entered each time one block of a part profile is entered.

Figure 10:
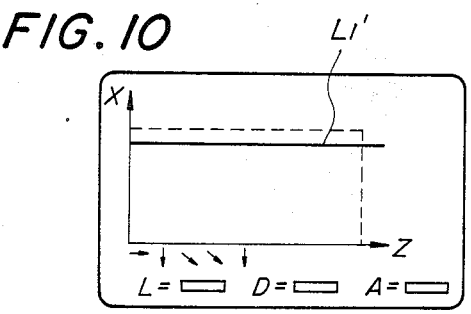
FIG. 10 is a view for describing another method of entering dimensions.

Further, an arrangement is possible wherein, when the dimensions of each block are to be entered, the display screen is made to display inquiries calling for the diameter value D, length L along the Z axis and the angle A, as shown in FIG. 10, in response to which the diameter value, length along the Z axis and angle written on the design drawing are entered in successive fashion. In a case where no dimension is written on the drawing, the input key NL is pressed without making any entry.

In FIG. 3, numeral 106 denotes an NC data output unit for delivering created NC data to an external storage medium 107.

Industrial Applicability

According to the present invention, angles written on a design drawing can be entered as is without giving any consideration to their sign, the angles can be entered through a simple operation and angle entry errors can be eliminated. The present invention is therefore effective when applied to an NC tape automatic creation apparatus in which a part profile is specified by data including at least an angle.

We claim:

1. An angle data discriminating method in a method of creating NC machining data, comprising the steps of:
   (a) entering a direction for each block of a part profile through use of a profile symbol key thereby to specify said part profile;
   (b) entering a dimension for each block of said part profile;
   (c) using these entered data to create the NC machining data;
   (d) specifying a dimension of a straight line element in a predetermined block by data including at least an angle of intersection between said straight line element and a base line; and
   (e) calculating in accordance with the magnitude of said angle data and the direction of the stright line element in said block to determine whether or not said straight line element lies on a straight line obtained by rotating the base line about the point of intersection in a predetermined direction and through a predetermined angle.

2. An angle data discriminating method according to claim 1, characterized in that said base line is taken as a horizontal axis.

3. An angle data discriminating method according to claim 2, wherein step (e) includes the steps of:
   discriminating the direction of a part profile, discriminating whether an entered angle $\theta$ satisfies on the inequalities $$0 < \theta < 90° \text{ and } -180° < \theta < -90°$$

when said direction is upward toward the right or downward toward the left;
   determining that said angle $\theta$ is an angle in the counter-clockwise direction as seen from the horizontal axis in accordance with one of the inequalities being satisfied; and
   determining that an angle $-\theta$ which is obtained by reversing the sign of the angle $\theta$, is an angle in the counter-clockwise direction as seen from the horizontal axis in accordance with neither of said inequalities being satisfied.

4. An angle data discriminating method according to claim 2 or claim 3, wherein step (e) includes the steps of:
   discriminating the direction of a part profile;
   discriminating whether an entered angle $\theta$ satisfies one of the inequalities $$90° < \theta < 180° \text{ and } -90° < \theta < 0°$$

When said direction is downward toward the right or upward toward the left;
   determining that said angle $\theta$ is an angle in the counter-clockwise direction as seen from the horizontal axis in accordance with one of the inequalities being statisfied; and
   determining that an angle $-\theta$, which is obtained by reversing the sign of the angle $\theta$, is an angle in the counter-clockwise direction as seen from the horizontal axis in accordance with neither of said inequalities being statisfied.

5. An angle discriminating method according to claim 2, wherein step (d) includes a step of discriminating whether angle data have been entered.

* * * * *